United States Patent

Neadle et al.

[11] Patent Number: 6,042,230
[45] Date of Patent: Mar. 28, 2000

[54] MARKINGS FOR CONTACT LENSES

[75] Inventors: Susan Neadle; George Stanley, both of Jacksonville, Fla.

[73] Assignee: Johnson & Johnson Vision Products, Inc., Jacksonville, Fla.

[21] Appl. No.: 09/211,171

[22] Filed: Dec. 14, 1998

[51] Int. Cl.[7] .................................................. G02C 7/04
[52] U.S. Cl. ................... 351/160 R; 351/160 H
[58] Field of Search ........................ 351/160 R, 160 H, 351/161, 176, 177

[56] References Cited

U.S. PATENT DOCUMENTS

| | | | |
|---|---|---|---|
| 2,803,884 | 8/1957 | Polley | 33/507 |
| 4,194,814 | 3/1980 | Fischer et al. | 351/160 H |
| 4,219,721 | 8/1980 | Kamen et al. | 219/121 |
| 4,976,533 | 12/1990 | Hahn et al. | 351/160 R |
| 5,062,701 | 11/1991 | Drazba et al. | 351/160 R |
| 5,467,149 | 11/1995 | Morrison et al. | 351/162 |
| 5,641,437 | 6/1997 | Williams et al. | 264/2.5 |

FOREIGN PATENT DOCUMENTS

| | | |
|---|---|---|
| 6-230321 | 8/1994 | Japan . |
| 7-186290 | 7/1995 | Japan . |

OTHER PUBLICATIONS

Mandell, Robert B., Contact Lens Practice, Fourth Edition, pp. 669–678 (1988).

*Primary Examiner*—Georgia Epps
*Assistant Examiner*—Jordan M. Schwartz
*Attorney, Agent, or Firm*—Lois Gianneschi

[57] ABSTRACT

The invention provides marks for use in contact lenses and contact lenses that contain the marks, which marks are highly visible. The marks of the invention are useful for determining the inside versus the outside of the lens as well as for diagnostic purposes.

8 Claims, 2 Drawing Sheets

MARKINGS FOR CONTACT LENSES

FIELD OF THE INVENTION

The invention relates to marks useful in ophthalmic lenses. In particular, the invention relates to contact lenses that have highly visible marks.

BACKGROUND OF THE INVENTION

The use of marks on contact lenses for indicating whether the lens is for the right or left eye is well known. Additionally, it is known to use marks for indicating serial numbers, lot and batch numbers, and optical powers. Finally, marks have been used to measure the rotation of the lens on the eye as well as to orient the lens for inspection by quality control personnel.

One problem with some of the known marks is that they are difficult to see. Thus, a need remains for marks with improved on-eye visibility so that the mark may be used as a diagnostic tool. Additionally, a need remains for marks with improved off-eye visibility so that the wearer may differentiate the inside from the outside of the lens.

DETAILED DESCRIPTION OF THE INVENTION AND PREFERRED EMBODIMENTS

Figure 1:
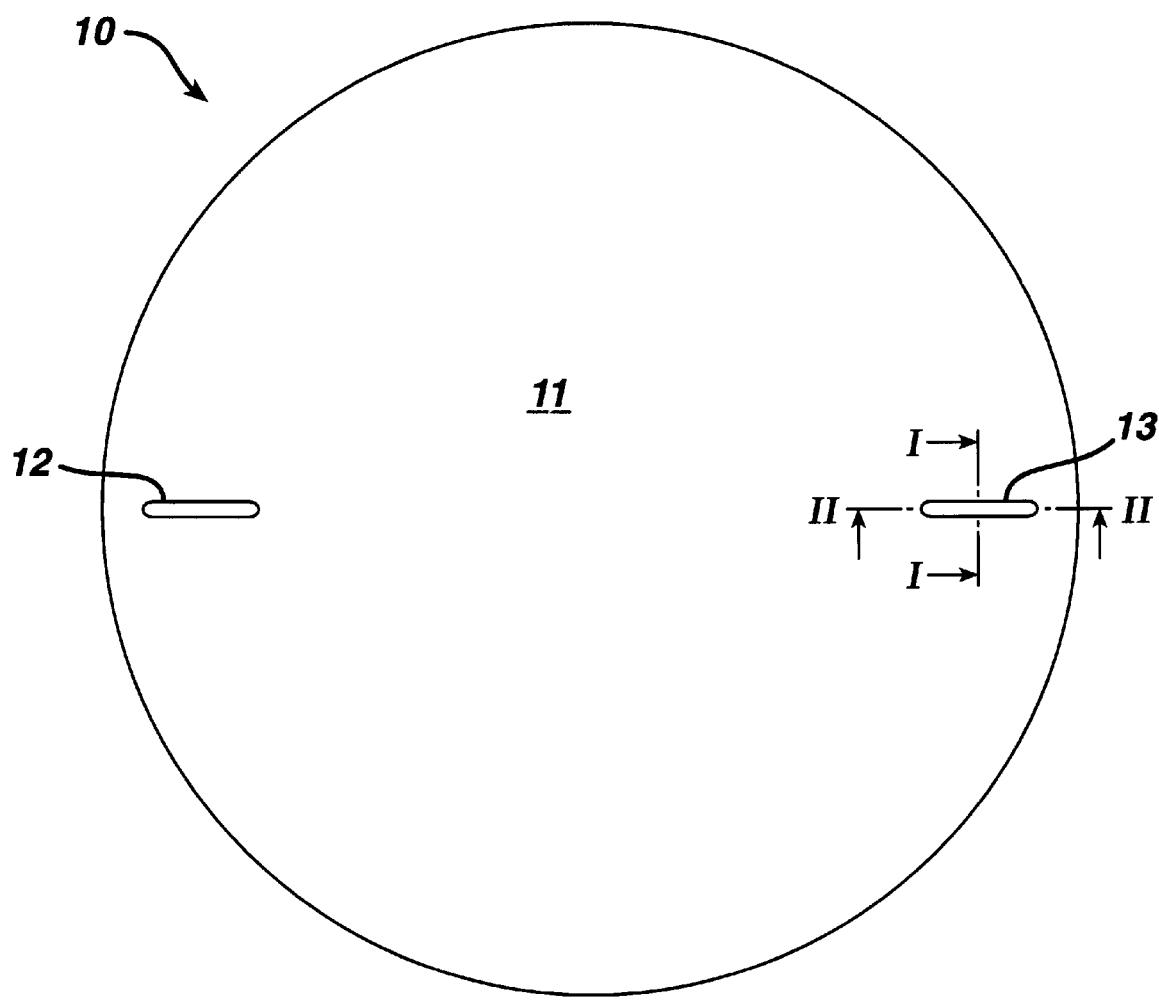
FIG. 1 is a plan view of a lens with a mark of the invention.

The invention provides a mark or a contact lens that is easily visible to the observer when the lens is off of the wearer's eye, but that is not visible or is nearly invisible when the lens is on the wearer's eye when the wearer is being observed under normal conditions. At the same time, when the lens is off of the eye and being held in ambient or additional light, the mark is readily visible and may be used to delineate the inside from the outside of the lens. The mark of the invention also is visible in diagnostic settings, such as under a slit-lamp and, thus, provides a convenient diagnostic tool for assessing position of the lens.

In one embodiment, the invention provides a mark for a contact lens comprising, consisting essentially of and consisting of a depression comprising, consisting essentially of and consisting of one or more side walls, the surfaces of the side walls being smooth, and a bottom having a roughened surface, the side walls being contiguous with the bottom. In another embodiment the invention provides a contact lens comprising, consisting essentially of and consisting of a front and a back surface, at least one of the surfaces having one or more marks, the one or more marks comprising, consisting essentially of and consisting of a depression comprising, consisting essentially of and consisting of one or more side walls, the surface of the side walls being smooth, and a bottom having a roughened surface, the side walls being contiguous with the bottom. In yet another embodiment the invention provides a method of making a contact lens having at least one mark of the invention.

By "smooth side wall" is meant that the surface of the side wall has a roughness of less than about $10\,\mu$ RMS, preferably less than about $3\,\mu$ RMS. By "roughened surface" is meant that the surface is uneven, or less smooth compared to the side walls.

Generally, the marks of the invention are depressions having a bottom with a roughened surface and side walls the surfaces of which are smooth, a critical feature of the mark. It is one discovery of the invention that when a lens having the mark of the invention is placed on the eye, the lens deforms to assume the shape of the eye and the mark flexes so that its smooth side walls are exposed to the wearer's eyelid. Thus the roughened bottom does not interfere with lens comfort or impede rotational stability of the lens. It is another discovery of the invention that by providing the bottom with a roughened surface, the mark becomes significantly more visible than in the absence of such roughening.

The mark of the invention has a top, side walls and a bottom, the side walls and bottom being contiguous. The top of the mark is the point at which the surface of the mark joins the surface of the lens into which the mark is formed. One ordinarily skilled in the art will recognize that the mark of the invention may be of any of a variety of shapes and still possess smooth side walls and a roughened bottom. For example, the mark may have a cross-section that is parabolic, spherical, hemispherical, elliptical, flat, or convex. The top of the mark also may be of any shape including, without limitation, square, rectangular, diamond, oval, circular, or the like. Preferably, the mark is hemispherical in shape in cross-section.

The width of the mark must be sufficiently narrow so that tear film does not fill the mark and render it indistinguishable from the rest of the lens and/or the iris and other structures behind the lens. The width of the mark of the invention is about 25 to about $300\,\mu$, preferably 25 to about $250\,\mu$, more preferably about 50 to about $200\,\mu$. The length of the mark is as long as is practicable without interfering with the lens' optics and/or the peripheral edge of the lens. Generally, the length is about 0.2 to about 3.0 mm, preferably about 0.6 to about 1.5 mm.

The depth of the mark is critical. The mark must be sufficiently deep so that the roughened surface does not interact with the lens wearer's eyelid. Generally, the mark is about $10\,\mu$ to about $50\,\mu$ preferably about $10\,\mu$ to about $35\,\mu$ in depth. The width to depth ratio is generally about 15:1 to about 2:1, preferably about 10:1. For ease of manufacture, preferably the mark is of an overall width that is the same throughout the mark.

Figure 2A:
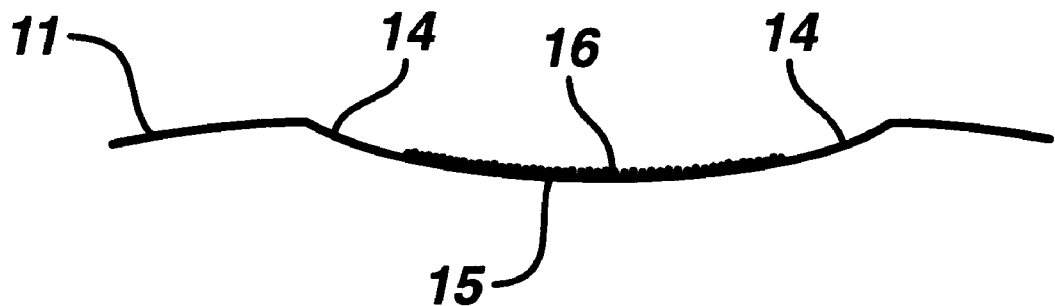
FIG. 2a depicts a cross-sectional view of a mark of the invention.
Figure 2B:
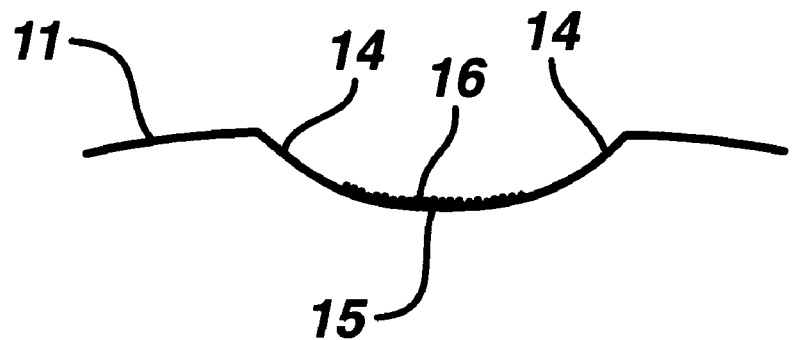
FIG. 2b is a longitudinal section of a mark of the invention.

Turning now to the figures, FIG. 1 depicts the convex surface 11 of lens 10. Marks 12 and 13 are shown at the lens' periphery along the 0–180° axis. One ordinarily skilled in the art will recognize that the marks of the invention may be placed at any point on the lens surface that is outside of the optical zone. FIGS. 2a and 2b are magnified cross-sectional and longitudinal views, respectively, of mark 13. FIG. 2a is a view along I—I of FIG. 1 and FIG. 2b is view along II—II. The mark 13 has smooth sidewalls 14 and concave bottom 15. Concave bottom 15 faces towards the surface 11 of lens 10 into which the mark is formed. Roughened surface 16 of bottom 15 is seen. The angle formed at the junction of the mark and the lens surface is designed for wearer comfort. For marks with widths of less than about $100\,\mu$, the angle α can be of any size. Although FIG. 1 depicts a mark on the convex surface of the lens, a preferred placement, it will be recognized that the mark may be placed on the concave surface or in a layer between the concave and convex surfaces of the lens.

The contact lens useful with the mark of the invention may be made of any known material suitable for making contact lenses. Preferably, the contact lenses are soft contact lenses, more preferably silicone or hydrophilic hydrogel lenses. Such lenses and materials for their production are well known to those ordinarily skilled in the art.

Contact lenses may be made with the marks of the invention by any convenient method. For example, such marks may be formed in the lens by using a laser, electrical discharge machining ("EDM"), mechanical scribing, diamond scribing, ultra-sonic scribing, holographic marking, and scattering by surface disruption. The roughened bottom may be formed using the same methods, the specific method being selected based on whether a uniform or randomly roughened bottom is desired. In a preferred method, the mark is made using diamond scribing and the bottom is then roughened using EDM. Although the mark may be added to the lens after the lens' manufacture, it is preferably added to the lens during its manufacture.

In a preferred manufacturing process for adding the lens during lens manufacture, durable molds are used to make resin molds into which monomers and/or prepolymers are added and cured to form the contact lenses. The durable molds may be constructed of any suitable material such as, without limitation, quartz, glass, stainless steel, copper alloy, or brass that additionally may have various nickel or nickel alloy plate coatings. Any coating material that takes the form of the mold nay be used. The durable molds may be treated via acid etching, laser, electrolysis, diamond scribing, Or other known methods to cut the mark into the surface of the mold.

The durable mold then is integrated into an injection molding process that is used to make the resin molds. The mark, according to a preferred embodiment, will rise out from the surface of the resin mold. When the prepolymer and/or monomer mixture used to make the lens is cured between the mold halves, the mark imprinted into the resin is transferred to the lens.

If a laser is used, the preferred laser is a YAG laser. Lasers may be used with or without masks. It is preferred not to use a mask to control the laser and to cut into the durable mold only in the areas of the mark. Preferably, the laser beam has its highest energy in the center of the beam to produce a shape on the durable mold in a single pulse or pass. Lasers also may be used to directly mark contact lenses with the mark.

It will be understood by those of ordinary skill in the art that various other changes of the details of the invention described may be made. Such changes are intended to be included within the scope of the invention claimed.

What is claimed is:

1. A mark for a contact lens comprising a depression comprising one or more side walls, the surfaces of the side walls being a smooth surface, and a concave bottom contiguous with the side walls and having a roughened surface, the mark having a depth of about 10 $\mu$ to about 50 $\mu$.

2. The mark of claim 1, wherein the side walls are of a roughness of less than about 3 $\mu$ RMS.

3. The mark of claim 1, wherein the mark has a width of about 25 to about 300 $\mu$ and a width to depth ratio of about 15:1 to about 2:1.

4. The mark of claim 2, wherein the mark has a width of about 25 to about 300 $\mu$ and a width to depth ratio of about 15:1 to about 2:1 .

5. A contact lens comprising a front and a back surface, at least one of the surfaces having one or more marks, the mark comprising a depression comprising one or more smooth side walls and a concave bottom contiguous with the side walls, the concave bottom having a roughened surface, the mark having a depth of about 10 $\mu$ to about 50 $\mu$.

6. The lens of claim 5, wherein the side walls are of a roughness of less than about 3 $\mu$ RMS.

7. The mark of claim 5, wherein the mark has a width of about 25 to about 300 $\mu$ and a width to depth ratio of about 15:1 to about 2:1.

8. The mark of claim 6, wherein the mark has a width of about 25 to about 300 $\mu$ and a width to depth ratio of about 15:1 to about 2:1.

* * * * *